May 10, 1966 M. ROSSNAN 3,249,962
APPARATUS FOR REMOVING MEAT FROM CRABS
Filed Sept. 23, 1965 2 Sheets-Sheet 1

INVENTOR
Michael Rossnan

May 10, 1966 M. ROSSNAN 3,249,962
APPARATUS FOR REMOVING MEAT FROM CRABS
Filed Sept. 23, 1965 2 Sheets-Sheet 2

INVENTOR

3,249,962
APPARATUS FOR REMOVING MEAT FROM CRABS
Michael Rossnan, 11724 Lovejoy St., Silver Spring, Md.
Filed Sept. 23, 1965, Ser. No. 489,622
7 Claims. (Cl. 17—2)

My present invention relates to improvements in apparatus for removing meat from crabs, one object of the invention being an apparatus for removing the meat from the cells or chambers of a crab by suction action and thus obtain the meat without particles of the shell and whether the meat is raw or cooked.

Another object of the invention is the provision of a method for removing the meat from the chambers of the crab body which comprises placing the crab back shell down upon an intermittently moving belt, where the operator clamps the crab in a selected place on the belt, for its movement to the next stop, where two spaced rotary saws are brought into play to sever the claws, crawling fingers and the paddles from the body to leave open ended stubs, while also the ends of the main shell are cut off, the belt being narrow enough to permit the severed parts to drop away from the belt and be collected into a hopper, at the end of this action, the belt now moves the crab to the next stop where two suction heads that have movements imparted to them to clamp upon the crab body and over the stubs and at which time a heavy strong concentrated suction action takes place to suck all of the meat within the chambers of the crab body and into a collector member, and without being drawn into the motor driven high power suction unit, the carcass is now moved to the point where the clamp is released and the carcass falls free of the belt into a hopper.

That this invention may be fully understood and its many advantages appreciated, attention is invited to the accompanying drawings, in which.

Figure 1:
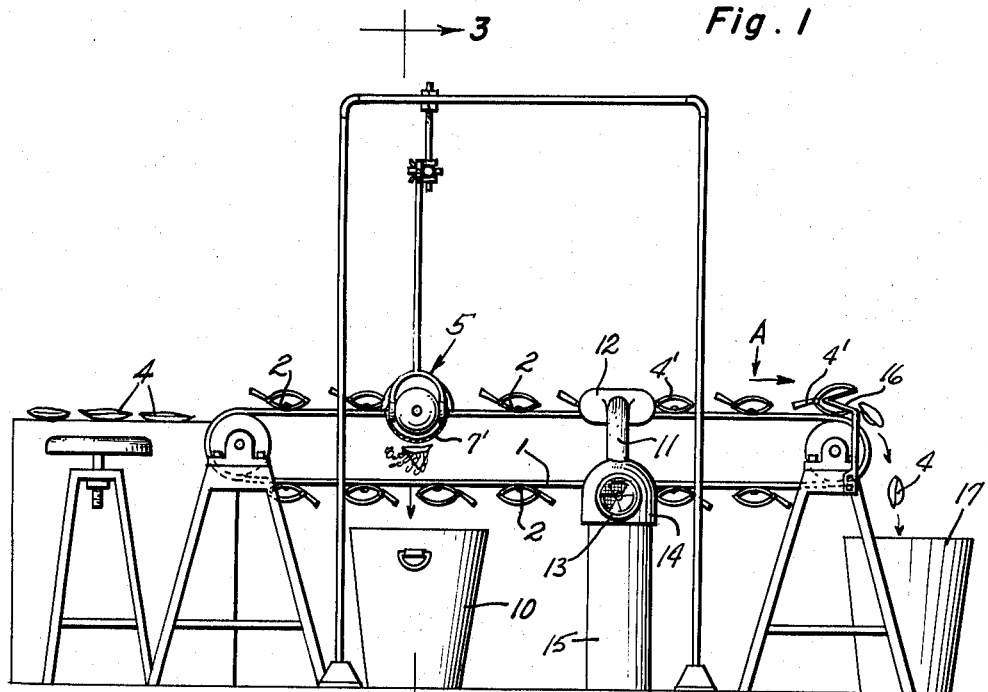
FIGURE 1 is a diagrammatical view of the complete apparatus in elevation.
Figure 2:
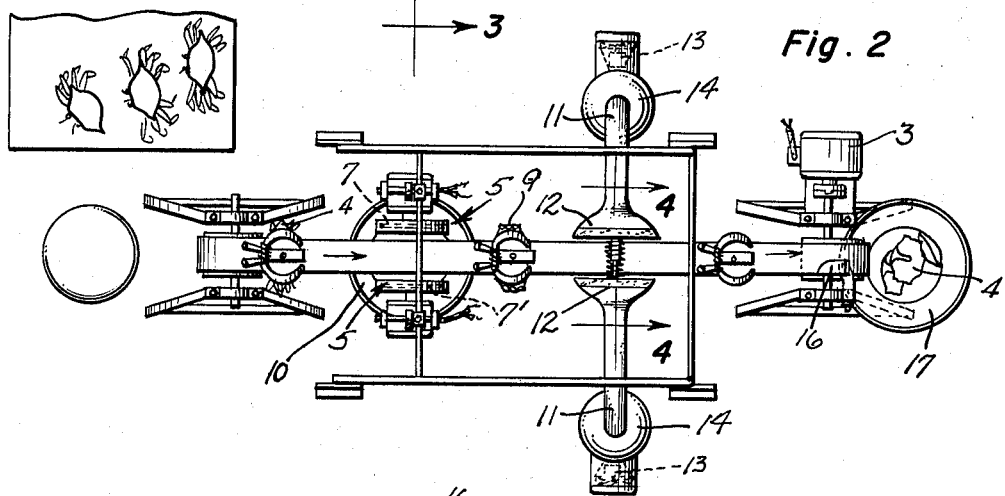
FIGURE 2 is a top plan view of the belt and crab holding device.
Figure 5:
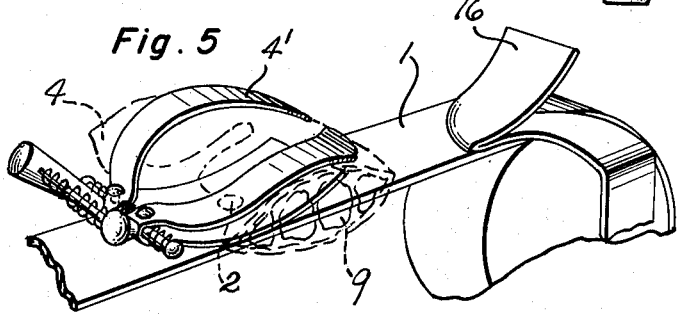
FIGURE 5 is a view of the crab body releasing mechanism.
Figure 3:
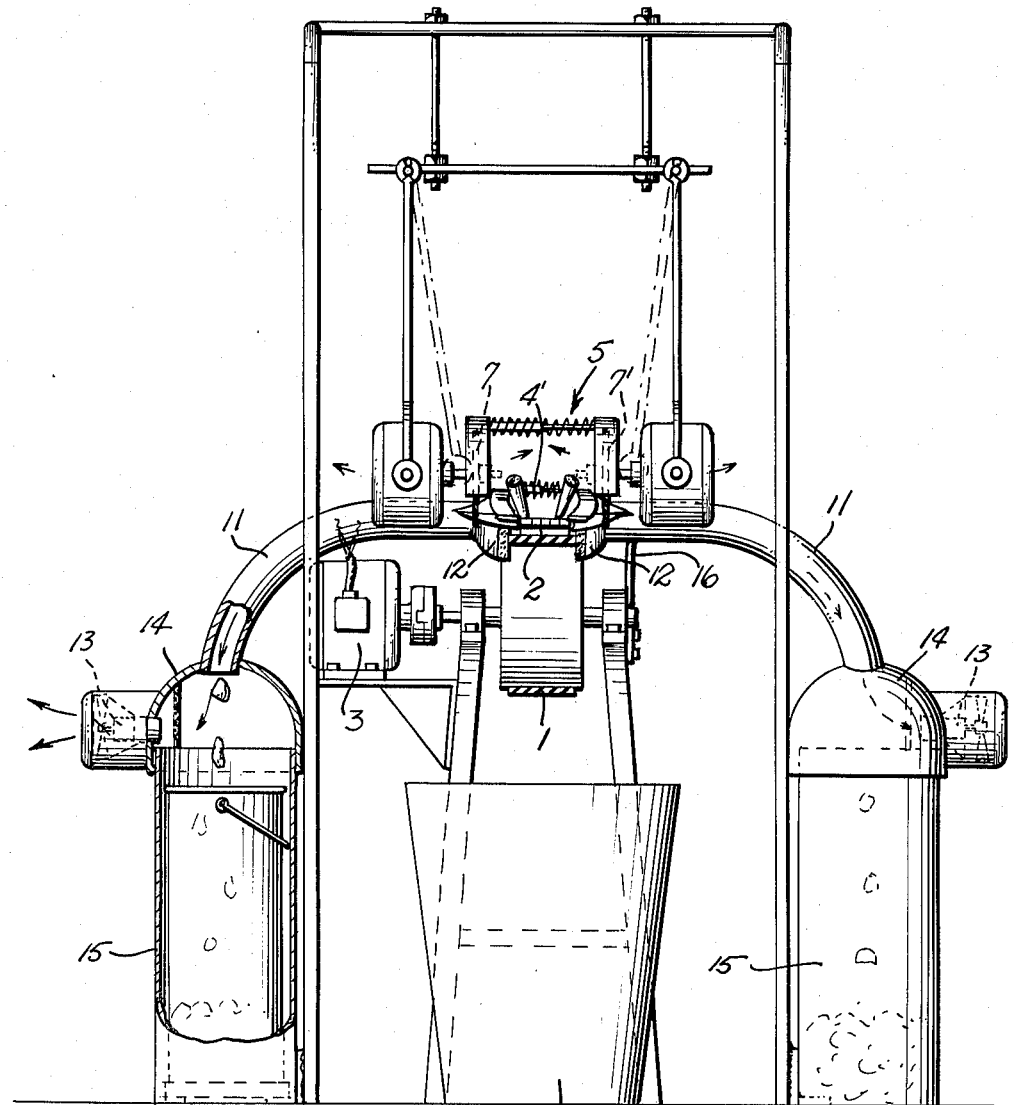
FIGURE 3 is a vertical sectional view taken on line 3—3 of FIGURE 1.
Figure 4:
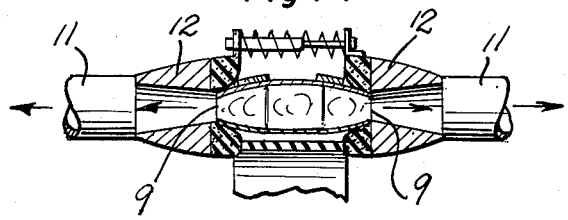
FIGURE 4 is a horizontal sectional view on 4—4 of FIGURE 2, the crab being in the position to be worked upon.

Referring to the drawings, the numeral 1, designates and endless narrow belt provided with crab body receiving means 2, and the intermittent drive 3, or motor which moves the belt intermittently one step at a time, equal to the distance between the several means 2.

The motor 3, drives the belt, in the direction of the arrow A, so that when the operator has placed the crab 4 into its receptacle 2, and fastened the clip 4', to hold the body in place, the belt now moves this crab body under the severing device 5, composed of two disc saws 7, 7', and the crab body, whose claws, crawling fingers, paddles and end portions of the main shell have been severed from the main crab body, leaving the open stubs 9 moves onto the next position.

The belt being made narrow permits the severed parts to drop into the hopper 10, while the belt now moves the thus held crab body to the suction position, where the mounted arms 11, carrying the suction heads 12, are moved inwardly by the spring action and into suction tight engagement with the opposite sides of the body of the crab and covering the open stubs, while simultaneously with this gripping, heavy suction from the motor driven suction device 13, acts to draw the meat from the cavities or chambers of the crab body, into the removal top 14 of the hopper 15, where the thus sucked meat is deposited.

At the end of this suction action, the suction heads are moved away from the crab body, and the belt moves again, this time to the clamp-releasing device 16, which is composed of a fixed metal wedge bracket to engage the gripping device to open the same and release the crab shell and as the belt is at its end of horizontal movement, the free crab shell is now dropped into its hopper 17. This cycle is repeated each time a crab is placed and clamped in its holder at the entrance or in this instance the left end of the endless belt.

From the foregoing description, taken with the drawings, it will be evident that here is provided an apparatus and also through it, a method of sucking the meat from the crab body so that only the body shell is left, and that the machine provides an intermittent action that provides means for the clamping of the crab, so that the belt by its intermittently operated action, deliver the then thus held crab to have its claws, crawlers, paddles, and end of the main shell removed and freed from the belt, then to the suction position, where by a blast suction the meat is removed through the hollow stubs from the body cavities and collected in the removable hopper, and the thus cleared crab shell body is then released at the end where the endless belt passes over the end pulley, thus dropping the shell into a hopper.

What I claim as new is:

1. An apparatus for removing the meat from crab bodies, including in combination, an intermittently motor driven endless belt, plurality of crab receiving means in spaced relation carried by the belt, crab holding means at each crab receiving means, means for cutting the claws, paddles, crawling fingers from the body of the crab, means for sucking the meat from the body cavities of the held crab, and means for releasing the holding means to permit the crab body to fall from the endless belt.

2. An apparatus for removing the meat from crab bodies, including in combination, a motor driven intermittently operated endless belt, crab body holding stations in spaced relation carried by the belt, means for holding the crab at each station, two spaced rotary disc saws to sever the claws, crawling finger, paddles and ends of the main shell, means for gripping upon opposite sides of the crab body and to instantly suck the meat from the cavities of the body of the crab, and means for releasing the thus treated crab shell from the endless belt.

3. An apparatus for removing the meat from crabs, including in combination, a supporting structure, an endless belt mounted therein, spaced crab receptacles carried by said belt, means for gripping a crab in each receptacle, means for imparting step-by-step movement to the endless belt, a reciprocatingly mounted pair of spaced rotary disc saws for severing the claws, crawling fingers, and paddles from the crab body, means for sucking the meat from the cavities of the crab body, and means for releasing the crab shell from its receptacle on the belt.

4. An apparatus for removing the meat from the crab body as claimed in claim 1, wherein there is provided an intermittently operated suction device and an intermediate receptacle connected to said sucking means.

5. An apparatus for removing the meat from the crab body as claimed in claim 2, wherein there is provided an intermittently operated suction device and an intermediate receptacle connected to said sucking means.

6. An apparatus for removing the meat from the crab body as claimed in claim 3, wherein there is provided an intermittently operated suction device with an intermediate receptacle is connected to the suction head.

7. An apparatus for removing the meat from crab bodies, including in combination, a motor driven intermittently operated endless belt, crab body holding stations in spaced relation carried by the belt, means for holding the crab at each station, means for severing the claws, crawling finger, paddles and ends of the main shell, means for gripping upon opposite sides of the crab body and to instantly suck the meat from the cavities of the body of the crab, and means for releasing the thus treated crab shell from the endless belt.

References Cited by the Examiner

UNITED STATES PATENTS

| 965,706 | 7/1910 | Greiner | 17—2 |
| 2,838,786 | 6/1958 | Ward | 17—2 |
| 2,903,737 | 9/1959 | Ward | 17—45 |
| 2,978,334 | 4/1961 | Lapeyre | 17—45 |

SAMUEL KOREN, *Primary Examiner.*

LUCIE H. LAUDENSLAGER, *Examiner.*